Figure 5:
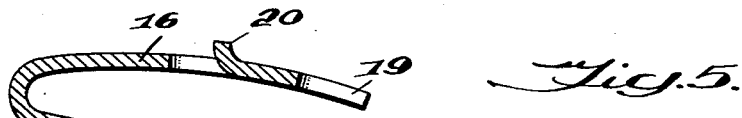

Sept. 15, 1964   L. MARKOFF-MOGHADAM   3,148,425
SAFETY CLIP
Filed March 26, 1962   2 Sheets-Sheet 1
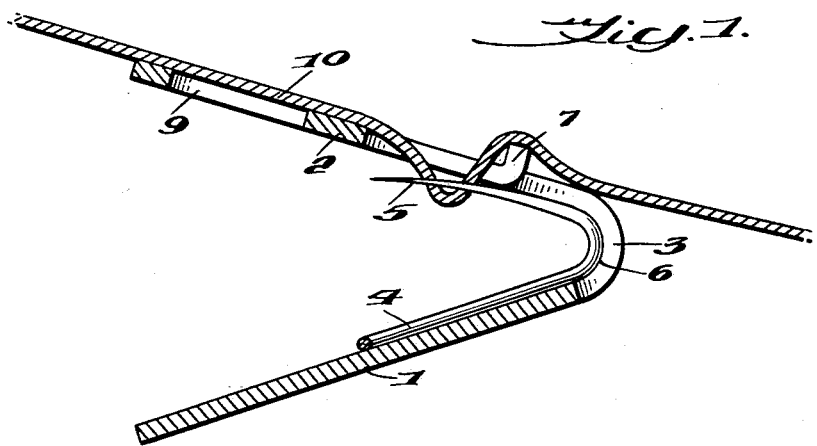
Fig. 1.
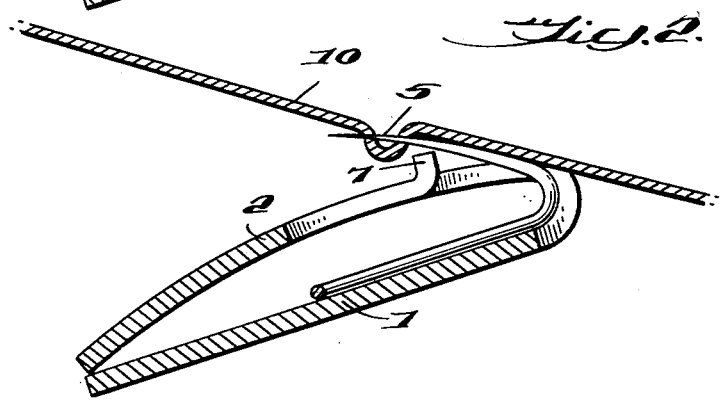
Fig. 2.
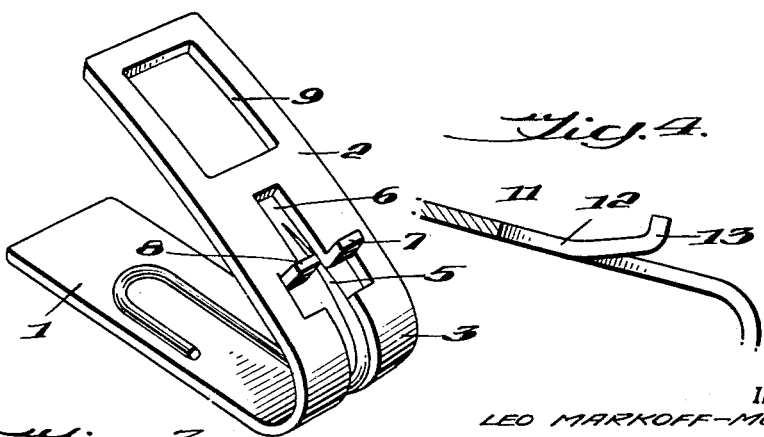
Fig. 3.
Fig. 4.
INVENTOR.
LEO MARKOFF-MOGHADAM,
BY
Larson and Taylor
ATTORNEYS Sept. 15, 1964    L. MARKOFF-MOGHADAM    3,148,425
SAFETY CLIP Filed March 26, 1962    2 Sheets-Sheet 2

INVENTOR.
LEO MARKOFF-MOGHADAM,
BY
Larson and Taylor
ATTORNEYS

3,148,425
SAFETY CLIP
Leo Markoff-Moghadam, 2938 Newark St. NW.,
Washington, D.C.
Filed Mar. 26, 1962, Ser. No. 182,433
6 Claims. (Cl. 24—161)

The present invention relates to a fastening device and more particularly to a safety clip of the type such as disclosed in my copending application Serial No. 142,947, filed October 4, 1961, now Patent No. 3,049,770. The clip disclosed in the above referred to prior application combines the ease of fastening of an ordinary straight pin with the security advantages of a safety pin.

In my prior application there is disclosed a clip which combines utility in connection with costume jewelry, badges and similar devices requiring a ready means for attaching the object to a garment. The clip comprises a pair of resiliently interconnected arms with a pin secured to one arm and a slot on the other arm, the pin being adapted to extend through the slot when the arms are pressed together so that the pin is exposed and able to engage fabric or the like and the engaged fabric will be drawn through the slot when the arms are released. The end portion of the slot is provided with a cross guard which extends angularly from the arm and provides a locking means for preventing the fabric from becoming disengaged from the pin unless the arms are pressed together.

The present invention relates to an improved cross guard locking means wherein the cross guard comprises portions of the arm which are bent angularly upwardly adjacent the mid-portion of the slot. These upstruck portions provide a locking means and function similarly to the cross guard disclosed in the above referred to prior application.

Another embodiment of the present invention comprises three arms which are resiliently interconnected, the base or bottom arm having a pin secured thereto with slots in the intermediate and upper arms and a cross guard in the upper arm. This clip functions in substantially the same manner as the clip previously referred to and the additional arm and cross guard provide means for firmly locking the fabric in engagement with the clip.

An object of the present invention is to provide a clip which is adapted to be readily engageable with fabric and yet which provides means for firmly locking the fabric in engagement with the clip.

Another object of the present invention is to provide an improved and simplified cross guard structure for a clip comprising a pair of arms resiliently interconnected with a pin mounted on one arm, the pin adapted to extend through a slot on the other arm to engage fabric when the arms are pressed together.

Still another object of the present invention is to provide a clip comprising three arms resiliently interconnected, the arms being disposed in substantially a Z shape configuration, a pin being secured to one arm with slots in the intermediate and other arm, the slotted arm having cross guard means thereon to lock fabric in engagement with the clip when the arms are pressed together and released.

Figure 6:
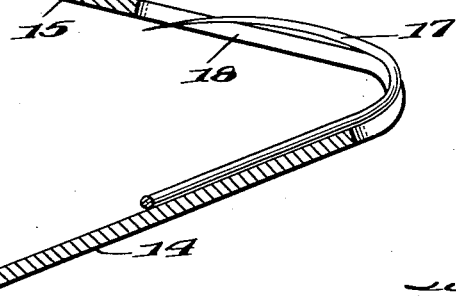
Figure 7:
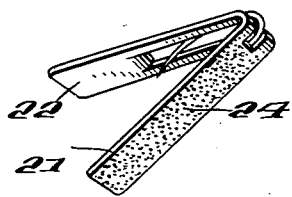
Figure 8:
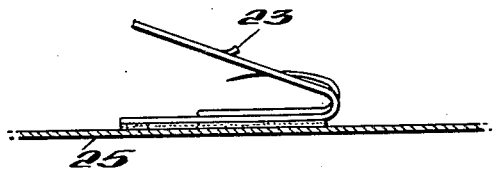

Other objects and many of the attendant advantages of the present invention will become more readily apparent with consideration of the following detailed specification in connection with the accompanying drawings wherein:

FIG. 1 is a sectional view of one embodiment of a clip showing fabric engaged therewith, FIG. 2 is a sectional view similar to FIG. 1 showing the arms pressed together with the fabric about to be disengaged from the pin, FIG. 3 is a perspective view of the pin shown in FIGS. 1 and 2, FIG. 4 is a partial sectional view of another embodiment of the clip, FIG. 5 is a sectional view of still another embodiment, FIG. 6 is a sectional view of a clip according to FIG. 5 with the arms pressed together, FIG. 7 is a perspective view of another form of clip and, FIG. 8 is a side elevation of the clip shown in FIG. 7 secured to a backing.

Referring now more specifically to the drawings wherein like numerals indicate like parts throughout the several views there is shown in FIG. 1 a clip comprising a pair of arms 1 and 2. These arms are resiliently interconnected by means of an integral U-shaped portion 3.

The arm 1 has secured thereto as by means of solder or the like a pin 4. This pin has the free end portion thereof bent in a substantially U-shape so that the sharpened end portion 5 at the tip of one of the arms of the U extends substantially parallel or at a small angle with respect to the base 1.

There is provided in the arm 2 a slot 6 and this slot may extend into the U-shaped interconnecting portion 3 and, if desired, into the end portion of the lower arm 1. It can be seen that the U-shaped portion of the pin 4 extends into the slot as shown at 6 in FIG. 1.

The upper arm is provided with upstruck tabs 7 and 8 which provide a locking means for cross guard for the pin 5 in a manner that will become more fully apparent hereinafter. The upper arm 2 is also provided with an opening 9 which provides a finger gripping slot.

In use the arms 1 and 2 are pressed together so that the pin 5 extends through the slot 6 as shown in FIG. 2. In this position the pin may be engaged with fabric such as, for example, the fabric 10 so that when the pressed together arms 1 and 2 are released the fabric will be drawn through the slot in the manner shown in FIG. 1. The fabric passes over the cross guards 7 and 8 and by reason of this particular arrangement the fabric will not become disengaged from the pin 5 until the arms 1 and 2 are again pressed together.

In FIG. 4 there is shown a modified form of locking means or cross guard and in this embodiment the arm 11 is provided with elongated tabs 12 which are bent upwardly as at 13. The tabs 12 may extend from one end of the slot to a point adjacent the mid-portion of the slot. In both the FIGS. 1 to 3 and FIG. 4 embodiment the tabs extend outwardly from the upper arm in a direction away from the base. These tabs may be integrally formed with the upper arm or, if desired, may be separately attached.

It is obvious that in any of these embodiments a plurality of pins may be incorporated on a single clip for greater holding power.

In FIGS. 5 and 6 there is shown still another embodiment of the present invention wherein an elongated strip of metal is bent into a base 14, intermediate arm 15 and upper arm 16. These arms are resiliently interconnected and may be in substantially a Z shape configuration. A pin 17 is secured to the base 14 and this pin is adapted to extend through a slot 18 in the intermediate arm 15 and through a slotted end portion 19 in the arm 16. The upper arm 16 is provided with outwardly extending projections 20 which function in a manner similar to the tabs 7 and 8 in the FIGS. 1 to 3 embodiment. It can be seen that in this embodiment when fabric is engaged with the clip there will be substantial spacing between the pin and the upper arm 16 as seen in FIG. 5. This provides for greater holding power with this clip.

In FIG. 6 the arms are shown as pressed together and it can be seen that the pin 17 extends through the slot 19 so as to be free to engage fabric. When the arms are released to assume the FIG. 5 position fabric on the pin 17 will be drawn through the slot 19 and the slot 18 and will be locked in this position.

In FIGS. 7 and 8 there is shown a clip similar to a clip shown in my prior application referred to hereinbefore. This clip comprises a base 21 and upper arm 22 with a pin mounted on the base and adapted to extend through a slot in the upper arm. A cross guard 23 is provided on the upper arm. In this embodiment a pressure sensitive adhesive 24 is applied to the base 21 so that the clip may be readily secured to a backing such as the backing 25 shown in FIG. 8. This embodiment finds particular utility in connection with mounting the clip on badges or identification cards wherein it is desirable to provide an economical and quick means of attaching such cards to garments.

Obviously, many modifications and variations of the present invention are possible in light of the above teachings. What is claimed as new and desired to be secured by Letters Patent is:

1. A clip comprising a pair of arms resiliently interconnected and normally is a spaced apart position, there being an elongated slot in one of said arms, a pin rigidly secured to said other arm, locking means on said one arm, said locking means comprising portions extending angularly from said arm in a direction away from said other arm, said portions being disposed at the sides of the slot intermediate the ends thereof, said pin having the free end portion adapted to extend through the slot when said pair of arms is urged together, said pin adapted to engage fabric when the pin is extended through the slot and the engaged fabric being drawn through the slot in said arm and over the locking means when the arms are released so as to lock the fabric in engagement with the clip to prevent the fabric from slipping from the clip.

2. A clip according to claim 1 wherein said slot extends through the resilient interconnection of said pair of arms and into the end portion of said other arm.

3. A clip according to claim 1 wherein said locking means comprises integral upstruck portions of said one arm.

4. A clip according to claim 1 wherein said locking means comprises elongated tabs integral with said one arm, said tabs being bent angularly upwardly adjacent the mid-portion of said slot.

5. A clip for costume jewelry and the like comprising a pair of arms resiliently interconnected and normally in a spaced apart position, there being an elongated slot in one of said arms, a pin rigidly secured to said other arm, a cross guard on said one arm, said cross guard comprising portions extending angularly from said arm in a direction away from said other arm, said portions being disposed at the sides of the slot intermediate the ends thereof, said pin having the free end portion adapted to extend through the slot when said pair of arms is urged together, said pin adapted to engage fabric when the pin is extended through the slot and the engaged fabric being drawn through the slot in said arm and over the cross guard when the arms are released so as to lock the fabric in engagement with the clip to prevent the fabric from slipping from the clip.

6. A clip according to claim 5 wherein said slot extends through the resilient interconnection of said pair of arms and into the end portion of said other arm.

References Cited in the file of this patent
UNITED STATES PATENTS

| | | |
|---|---|---|
| 402,685 | Moore | May 7, 1889 |
| 542,763 | Heaps | July 16, 1895 |
| 591,835 | Gosewisch | Oct. 19, 1897 |
| 697,936 | Dunham | Apr. 15, 1902 |